UNITED STATES PATENT OFFICE.

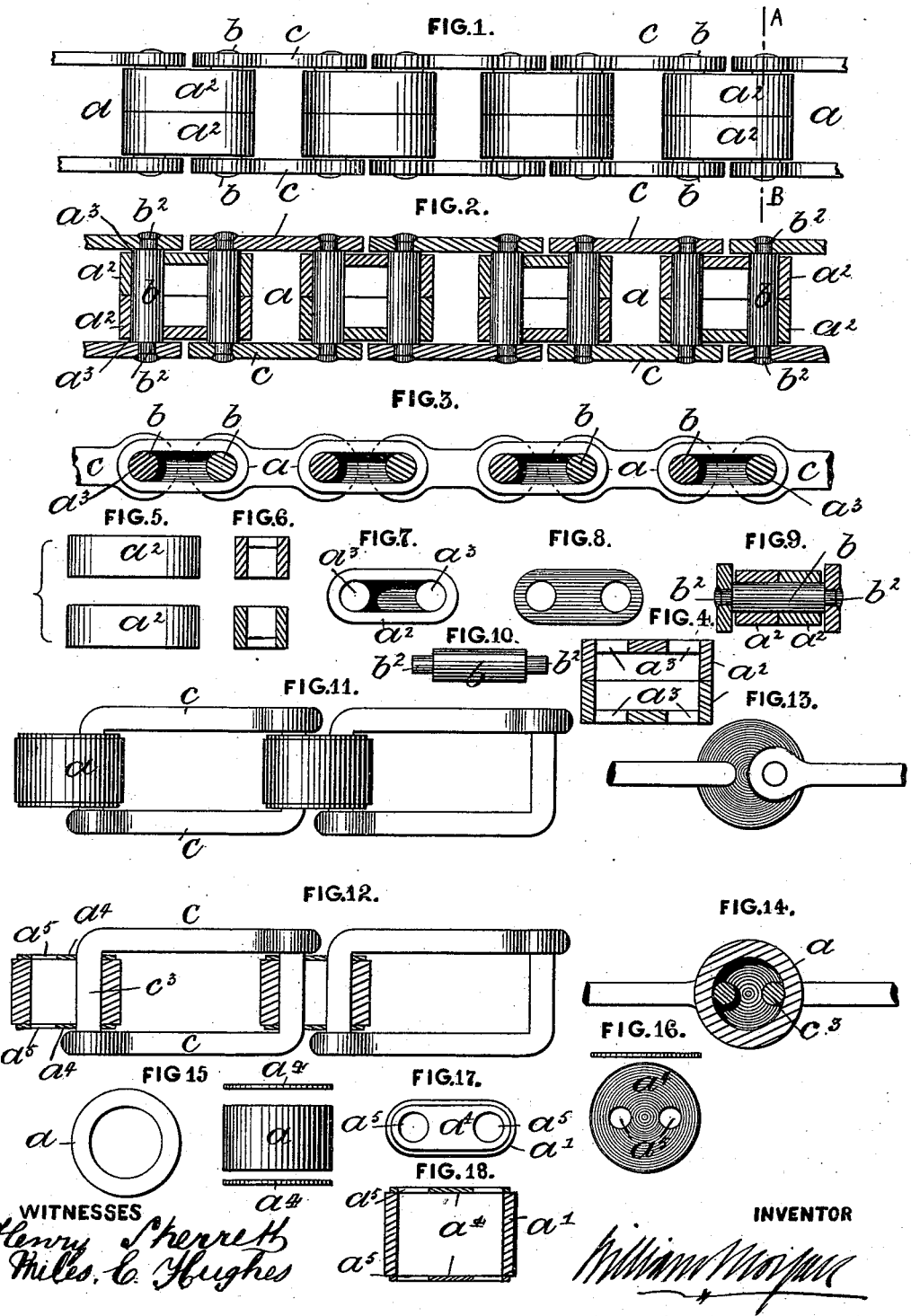

WILLIAM MORGAN, OF BIRMINGHAM, ENGLAND.

DRIVE-CHAIN.

SPECIFICATION forming part of Letters Patent No. 355,620, dated January 4, 1887.

Application filed September 30, 1886. Serial No. 214,951. (No model.) Patented in England May 31, 1886, No. 7,234.

*To all whom it may concern:*

Be it known that I, WILLIAM MORGAN, a subject of the Queen of Great Britain, residing at Cannon Street, Birmingham, England, manufacturer, have invented a new or Improved Drive-Chain, (for which I have applied for Letters Patent in Great Britain, No. 7,234, dated 31st day of May, 1886,) of which the following is a specification.

My invention relates to that class of chain commonly called "drive-chain," or chain employed particularly for the driving of velocipedes, although the same may be used for driving purposes generally; and my said invention consists in making the intermediate or alternative links which carry, and through which the connecting pivot-bars or axial pins of the said links pass, box-like or hollow, for the purpose of holding plumbago or other lubricant for the lubrication of the bearings of the pivot cross-bars or axial pins passing through them. These alternative or intermediate box-links are made longer in one direction than in the other, so as to form flat chambered-like connections with the other links, or the said box-links may be made in the form of a roller.

I will now proceed to describe, with reference to the accompanying drawings, the manner in which the same is to be performed.

Figure 1 represents in plan, Fig. 2 in horizontal section, and Fig. 3 in longitudinal vertical section, a chain (provided with alternative or intermediate box-links made in halves) constructed according to my invention. Fig. 4 represents in section one of the links separately. Fig. 5 represents in elevation the two halves of the said box-link separated, while Fig. 6 represents a transverse section of the same. Fig. 7 represents a front inside view of one of the half box-links, and Fig. 8 is an outside view of the same. Fig. 9 is a cross-section of the chain on the dotted lines A B, Fig. 1, and Fig. 10 shows the pivot-bar or axial cross-pin (separately) which forms the connection between the adjacent links constituting the chain. Fig. 11 is a plan view of a modification in which the intermediate links are in the form of cylindrical rollers. Fig. 12 is a horizontal section of same. Fig. 13 is an end view. Fig. 14 is a transverse section. Figs. 15 and 16 are detached views of parts of the roller-link. Fig. 17 is a side view of an elongated box-link. Fig. 18 is a sectional view of the same.

$a\ a$ are box-links wherein plumbago, solid oil, or other lubricant is stored before the links are put together for the lubrication of the bearings of the movable parts when the chain is in use—that is, the lubricant inclosed within the box-links is supplied to both the bearings of the pivots or axial cross-pins $b$, which unite the connecting parallel side links, $c$, to the said intermediate box-links, $a$, and to the bearing-holes $a^3$, wherein the axis $b$ works. These box-links $a$ are divided longitudinally or in the direction of their length, with their open sides presented to each other, so that on coming together, as shown at Fig. 4, they form a chamber or hollow box with axial or pin holes $a^3$ passing transversely through them. The halves or segments of the box-links are marked $a^2$.

The pins or connecting-axes $b$, upon which the box-links turn, are provided at their outer ends with necks $b^2$, which pass through suitable holes, $c^2$, in the connecting side links, $c$, and are then riveted. The riveting of the ends affixes the side links, and makes the axial cross-pin the joint upon which the box-links turn as a center on the traveling of the chain on communicating motion from a distance.

By constructing chain as described they carry their own means of lubrication—that is, they carry a store of lubricant material within the box-links, which is delivered automatically to the bearing and wearing surfaces by the movement of the parts.

Although I have described that the principal object of my invention is the production of chain-links that will carry their own lubricant, yet I wish it to be observed that the chain as represented may be used as a drive-chain without being provided with a store of lubricant.

Fig. 11 represents a modification in which the alternate or intermediate link is made in the form of a roller. Fig. 12 represents a part horizontal section. Fig. 13 is an end elevation; Fig. 14, a transverse section; and Figs. 15 and 16 represent parts of one of the roller-links separately.

$a$ are box-roller links, and $a^4$ are side plates or covering-lids with holes $a^5$, through which the end bars, $c^3$, of the links $c$ pass in connecting or joining up one link with another, and within the space or hollow inclosed by the lids or sides $a^5$ lubricant is stored for supplying the wearing and bearing surfaces with the same when the chain is in use.

By connecting the links together, as described, the roller $a$ admits of free rotation on the traveling of the chain.

Fig. 17 represents in side elevation an elongated box-link, like $a$ in Fig. 1, but formed in one piece, and provided with side plates or lids for the keeping in of the lubricant placed within it, as in the roller-link last described and represented at Figs. 11 and 12. Fig. 18 represents a part vertical section of the same, showing the side covering-plates and the transverse holes through which the axes of an adjacent link passes.

$a'$ is a flattened box-link. $a^4$ are the side plates, and $a^5$ are the axial holes through the same.

Having thus described my invention, I claim as new and desire to secure by Letters Patent—

1. A drive-chain having its alternate links constructed in the form of hollow boxes adapted to contain lubricating material, said boxes being each made in sections with their joints parallel with the sides of the chain and secured in place by transverse connections, substantially as described.

2. In a drive-chain, the combination, with the links composed of the side pieces, $c$, and transverse connecting-pins $b$, of the hollow box-links $a$, adapted to contain lubricating material and made each in sections, substantially as described and shown.

Signed this 10th day of September, 1886.

WILLIAM MORGAN.

Witnesses:
HENRY SKERRETT,
MILES E. HUGHES,
*Both of Birmingham.*